United States Patent [19]

Raun

[11] 3,928,571
[45] Dec. 23, 1975

[54] RUMINANT FEED UTILIZATION IMPROVEMENT

[75] Inventor: Arthur P. Raun, New Palestine, Ind.

[73] Assignee: Eli Lilly and Company, Indianapolis, Ind.

[22] Filed: Feb. 14, 1974

[21] Appl. No.: 442,541

Related U.S. Application Data

[62] Division of Ser. No. 315,721, Dec. 15, 1972, Pat. No. 3,816,618.

[52] U.S. Cl. ............................................... 424/118
[51] Int. Cl.² ........................................ A61K 35/70
[58] Field of Search ........................... 424/118, 115

[56] References Cited
OTHER PUBLICATIONS

Hamill et al., — Chem. Abst., Vol. 77, (1972), p. 138338n.

*Primary Examiner*—Sam Rosen
*Attorney, Agent, or Firm*—Dwight E. Morrison; Everet F. Smith

[57] ABSTRACT

Ruminant animals having a developed rumen function and animals which ferment fibrous vegetable matter in the cecum convert their feed more efficiently to energy when orally treated with an antibiotic chosen from among A477, A-4696, vancomycin, and ristocetin and their physiologically-acceptable salts and esters.

7 Claims, 2 Drawing Figures

RUMINANT FEED UTILIZATION IMPROVEMENT

This application is a division of application Ser. No. 315,721, filed Dec. 15, 1972, now U.S. Pat. No. 3,816,618, issued June 11, 1974.

BACKGROUND OF THE INVENTION

For many years, the animal science industry has tried to increase the efficiency of feed utilization in both ruminant and nonruminant animals. The ruminant animals are of more economic importance, and so, necessarily, is the efficiency of the utilization of ruminants' feed.

In the course of investigating the efficiency of feed use, the mechanism by which ruminants digest and degrade the components of their feed to form molecules which can be metabolically utilized has been intensively studied. The mechanism of carbohydrate utilization is now well known. Microorganisms in the rumen of the animal ferment the carbohydrate to produce monosaccharides, and then degrade the monosaccharides to pyruvate compounds.

Pyruvate is then metabolized by microbiological processes to either acetate or propionate compounds, which may be either acids or other forms of the radicals. Two acetate radicals may be combined thereafter, still in the rumen, to form butyrates. Leng, "Formation and Production of Volatile Fatty Acids in the Rumen", *Physiology of Digestion and Metabolism in the Ruminant* (Phillipson et al. ed.), Oriel Press, pages 408–10.

The animal can utilize butyrate, propionate, and acetate with differing degrees of efficiency. Utilization of these compounds, which are collectively known as volatile fatty acids (VFA), occurs after absorption from the gut of the animal. Butyrate is utilized most efficiently, and acetate the least efficiently. However, the relative efficiency of use of butyrate is negated by the inefficiency of the manufacture of butyrate, which must be made from acetate in the rumen.

One of the major inefficiencies in the rumen is in the manufacture of acetate. Since it is made by the degradation of a pyruvate molecule, each molecule of acetate which is produced is accompanied by a molecule of methane. Most of the methane produced is lost through eructation. Since butyrate is made from two molecules of acetate, each molecule of the relatively efficiently used butyrate involves the loss to the animal of two molecules of methane, with all of the associated energy.

Thus, the efficiency of carbohydrate utilization (carbohydrates being the major nutritive portion of ruminant animals' feed) can be increased by treatments which encourage the animal to produce propionate rather than acetate from the carbohydrates. Further, the efficiency of feed use can be effectively monitored by observing the production and concentration of propionate compounds in the rumen. If the animal is making more propionates, it will be found to be using its feed more efficiently.

The relative efficiency of utilization of the VFA's is discussed by McCullough, *Feedstuffs*, June 19, 1971, page 19; Eskeland et al., *J. Anim. Sci.* 33, 282 (1971); and Church et al., *Digestive Physiology and Nutrition of Ruminants*, vol. 2 (1971), pages 622 and 625.

It has been well established that the efficiency of feed utilization by a ruminant animal can be readily determined by chemical analysis of the fermentation occurring in the rumen. For example, Marco et al., U.S. Pat. No. 3,293,038, taught the use of alkylated phenols as feed additives for improved feed efficiency. They disclosed an in vitro rumen fermentation test, and in vivo animal feeding studies, which were evaluated by chemical analysis of the rumen contents for acetate and propionate.

O'Connor et al., *J. Anim. Sci.*, 30, 812–18 (1970), reported the results of in vitro rumen fermentation tests on a large number of compounds. German Pat. No. 2,059,407 reported the use of a hemiacetal of chloral and starch as a feed additive which inhibits the formation of methane and produces higher than normal levels of propionic and butyric acids.

Marco et al., U.S. Pat. No. 3,522,353, taught the use of halogenated acyclic carboxylic acids as feed additives. It was there shown that the compounds produced in vitro increases in propionate production, and also increased feed efficiency in animals fed those compounds. To a similar effect is Erwin et al., U.S. Pat. No. 3,564,098.

The condition called ketosis is a manifestation of faulty VFA balance, which amounts to a clinical illness. Ruminant animals maintained on a diet which naturally degrades to a high proportion of acetate and low proportion of propionate are likely to suffer from ketosis. Dairy animals are particularly prone to the condition. Under stress, such as the onset of high lactation, too little propionate is available. As a result, more acetate is used leading to a high concentration of ketones in the body and especially in the bloodstream. A treatment for ketosis is to feed propionic acid, a precursor of propionic acid, or glucose, any one of which tends to metabolize to propionate. Clearly, if the rumen could be encouraged to produce more propionate than normal from the diet, ketosis incidence could be reduced.

SUMMARY

This invention relates to a novel method of increasing the efficiency of feed utilization by ruminant animals having a developed rumen function, and by animals which ferment fibrous vegetable matter in the cecum. An antibiotic chosen from the group A477, A-4696, vancomycin, and ristocetin, and their physiologically-acceptable salts and esters is orally administered to the animals whose feed efficiency is to be increased.

DESCRIPTION OF THE PREFERRED EMBODIMENT

Figure 1:
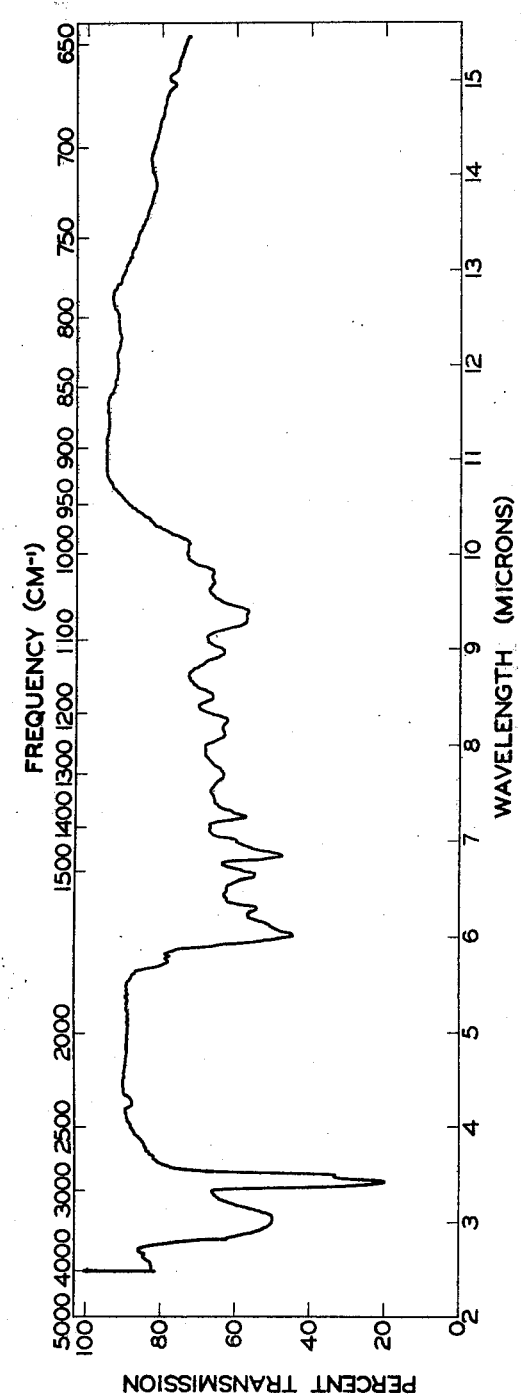

This novel method of improving feed utilization by ruminants having a developed rumen function comprises oral administration to the ruminants of an effective amount of a compound chosen from the group A477, A-4696, vancomycin, and ristocetin, and their physiologically-acceptable esters and salts.

This invention is particularly useful to ruminants which have a developed rumen function. Young ruminants, basically those still unweaned, function as monogastric animals. They use their simple liquid feeds just as monogastric animals do. As the young ruminants begin to eat solid feed, containing cellulose, starch, and other carbohydrates, the function of the rumen begins to develop, and the microbiological population of the rumen begins to build up. After the animal has eaten solid feed for a time, its rumen function reaches its full development and continues to operate throughout the animal's life.

This invention is functional in all of the ruminants, that is, the animals which have multiple stomachs, one of which is a rumen. The economically-important ruminant animals are cattle, sheep, and goats. This novel method is operable when the feed-utilization improving antibiotic is fed at rates from about 0.10 mg./kg./day to about 10.0 mg./kg./day. The preferred range of rates is from about 0.2 to about 2 mg./kg./day.

The compounds which are disclosed herein as effective in improving the utilization of ruminants' feed are all antibiotics of related structures.

McCormick et al., U.S. Pat. No. 3,067,099, describe vancomycin and teach the preparation and characteristics thereof.

Vancomycin is a fermentation product of several strains of an organism which has been given the name *Streptomyces orientalis*. These several strains are on unrestricted deposit under the identifying numbers NRRL 2450, NRRL 2451, and NRRL 2452, at the Northern Utilization Research and Development Division, Agricultural Research Service, United States Department of Agriculture, 1815 North University Street, Peoria, Illinois 61604.

Vancomycin, owing to its amphoteric nature, reacts with inorganic acids, for example, hydrochloric, sulfuric, phosphoric, and the like acids, and for convenience the resulting compounds are referred to as salts, although they may not be true normal salts.

The antibiotic ristocetin was isolated by Philip et al., as reported in *Antibiotics Annual* (1956–57) p. 699. The antibiotic was found to consist of two components, ristocetin A and ristocetin B.

The preparation of ristocetin A and its acid addition salts is described by Philip et al., U.S. Pat. No. 2,990,239.

Ristocetin A and B are fermentation products of the organism *Nocardia lurida*, which organism is on unrestricted deposit under the identifying number NRRL 2430, at the Northern Utilization Research and Development Division, Agricultural Research Service, United States Department of Agriculture, 1815 North University Street, Peoria, Illinois 61604.

The preparation of ristocetin A sulfate is described in British Pat. No. 850,408 (Oct. 5, 1960), *Chem. Abst.* 55, 10796e (1961).

The preparation of ristocetin B and its sulfate is described in British Pat. No. 843,560 (Aug. 4, 1960), *Chem. Abst.* 55, 3015h (1961).

Antibiotic A477 is a basic antibiotic capable of forming salts in a conventional manner with mineral acids such as hydrochloric acid, sulfuric acid, phosphoric acid, and the like, and also with a variety of organic acids including acetic acid, propionic acid, malonic acid, succinic acid, tartaric acid, maleic acid, picric acid, benzoic acid, p-toluene sulfonic acid, nicotinic acid, and the like.

Antibiotic A477, as the free base, is a white amorphous solid, having an elemental analysis as follows: 53.06 percent carbon, 6.18 percent hydrogen, 5.79 percent nitrogen, 31.40 percent oxygen and 3.39 percent chlorine. The specific rotation of antibiotic A477 is −66.6°, when determined at a temperature of 25°C. in 50 percent aqueous methanol solution in which the concentration of the antibiotic is 1 percent on a weight per volume basis.

The hydrochloride salt of A477 is a white crystalline solid with a melting point of 207°–212°C. It is soluble in warm water, and highly soluble in warm 50 percent aqueous methanol. The hydrochloride salt of A477 is stable in solution over a pH range of about pH 1 – pH 10 at temperatures up to about 27°C. Electrometric titration of A477 hydrochloride in water indicates the presence of one group with a pK'a value of 6.2, and five or more groups with pK'a values between 8 and 10.5. Electrometric titration of A477 hydrochloride in dimethylformamide:water (2:1) indicates the presence of two groups with pK'a values of 7.0 and 9.7, respectively, and two or more groups with pK'a values above 11.

Molecular weight determination by a vapor pressure osmotic method indicates the minimum molecular weight of A477 hydrochloride to be approximately 1480.

An average of several elemental analyses has shown antibiotic A477 hydrochloride to have approximately the following composition: 55.36 percent carbon, 6.02 percent hydrogen, 5.73 percent nitrogen, 28.99 percent oxygen, 4.52 percent total chlorine and 1.28 percent inorganic chlorine.

The infrared absorption curve of the hydrochloride salt of A477 in a mineral oil mull is shown in the accompanying drawing, FIG. 1. The following distinguishable absorption maxima are observed: 3.0, 5.8, 6.02, 6.3, 6.62, 6.84, 7.02, 7.26, 7.32, 7.7, 8.1, 8.27, 8.52, 8.97, 9.35, 9.7, 9.8, 10.1 microns.

The ultraviolet absorption spectrum of antibiotic A477 hydrochloride in acidic and neutral aqueous solution shows an absorption maximum at 283 m$\mu$, with an absorptivity value, $E_{1cm}^{1\%}$, of 70. In basic solution, A477 hydrochloride exhibits absorption maxima at 300 and 362 m$\mu$ with absorptivity values, $E_{1cm}^{1\%}$, of 60 and 53, respectively.

Antibiotic A477 is produced by culturing an A477-producing strain of an Actinoplanes organism under submerged aerobic conditions in a suitable culture medium until the culture medium contains substantial antibiotic activity. The antibiotic can be recovered by employing various isolation and purification procedures commonly used and understood in the art.

The microorganism useful for the preparation of antibiotic A477 is a species of the genus Actinoplanes of the family Actinoplanaceae. The Actinoplanaceae are a newly characterized family of microorganisms of the order Actinomycetales, having been first described by Couch, [*Jour. Elisha Mitchell Sci. Soc.*, 65, 315–318 (1949); 66, 87–92 (1950); *Trans. New York Acad. Sci.*, 16, 315–318 (1954); *Jour. Elisha Mitchell Sci. Soc.*, 71, 148–155 and 269 (1955); *Bergey's Manual of Determinative Bacteriology*, Seventh Edition, 825–829 (1957); *Jour. Elisha Mitchell Sci. Soc.*, 79, 53–70 (1963)].

The Actinoplanes culture useful for the production of antibiotic A477 has been deposited without restriction and made a part of the stock culture collection of the Northern Utilization Research and Development Division, U.S. Dept. of Agriculture, Peoria, Illinois 61604, from which it is available to the public under the number NRRL 3884.

As previously noted, Actinoplanes sp. NRRL 3884 can be grown in a culture medium to produce antibiotic A477. The culture medium can be any one of a number of media. However, for economy of production, maximum yield, and ease of isolation of the antibiotic, certain culture media are preferred. Thus, for example, dextrose is one of the preferred sources of carbohydrate and soybean meal is one of the preferred nitrogen sources.

Nutrient inorganic salts to be incorporated in the culture medium can include the customary salts capable of yielding sodium, potassium, ammonium, calcium, phosphate, chloride, sulfate, acetate, carbonate, and like ions. Additionally, sources of growth factors such as distiller's solubles and yeast extracts can be included with beneficial results.

As is necessary for the growth and development of other microorganisms, essential trace elements should also be included in the culture medium for growing the Actinoplanes employed in this invention. Such trace elements are commonly supplied as impurities incidental to the addition of the other constituents of the medium.

The initial pH of the culture medium can be varied widely. However, prior to inoculation with the organism, it is desirable to adjust the pH of the culture medium to between pH 6.5 and 7.3 depending on the particular medium employed. The final pH is determined, at least in part, by the initial pH of the medium, the buffers present in the medium, and the period of time for which the organism is permitted to grow.

Preferably, submerged aerobic fermentation in large tanks is used for the production of substantial quantities of antibiotic A477. Small quantities of the antibiotic are obtained by shake flask culture. Because of the time lag in antibiotic production commonly associated with the inoculation of large tanks with the spore form of the organism, it is preferable to use a vegetative inoculum. The vegetative inoculum is prepared by inoculating a small volume of the culture medium with the spore form or mycelial fragments of the organism to obtain a fresh, actively growing culture of the organism. The vegetative inoculum is then transferred to the larger tank. The medium used for the growth of the vegetative inoculum can be the same as that employed for larger fermentations, although other media can be employed.

The A477-producing organism can be grown at temperatures between about 20° and about 40°C. Optimal A477 production appears to occur at a temperature of about 30°C.

As is customary in aerobic submerged culture processes, sterile air is blown through the culture medium. For efficient growth of the organism and A477 production, the volume of air employed in the tank production of A477 preferably is upwards of 0.1 volume of air per minute per volume of culture medium.

The production of antibiotic activity during the fermentation can be followed by testing samples of the fermentation broth for their antibiotic activity against organisms known to be sensitive to the antibiotic. One such assay organism useful in the present invention is *Bacillus subtilis*. The bio-assay can be carried out conveniently by the paper disc assay on agar plates.

Generally, maximum production of the antibiotic occurs within two to six days in large tank or shake flask fermentation. Commonly, maximum production of antibiotic activity is realized within 48 to 96 hours.

Antibiotic A477 can be recovered from the culture medium and separated from other substances which may be present by extractive and adsorptive techniques. Adsorption processes for the recovery of A477 are preferred at present because such procedures eliminate the relatively large volumes of solvents required when extractive techniques are employed. Carbon is a suitable adsorbent for separating the antibiotic from the filtered culture broth, although other commonly-used adsorbents are equally satisfactory. The antibiotic substance fixed on the adsorbing agent is recovered by customary elution procedures. For further purification of A477, adsorption and elution procedures using adsorptive materials such as polyamide resin, alumina, Sephadex G-50 and the like can be advantageously employed. Ion exchange resins may also be employed for the purification of A477. The preparations of A477 and its salts are exemplified hereinbelow.

PREPARATION 1

A. Shake flask fermentation of A477

A culture of Actinoplanes sp. NRRL 3884 was prepared and maintained on an agar slant having the following composition:

| Ingredient | |
|---|---|
| Precooked oatmeal | 60.0 g. |
| Yeast | 2.5 g. |
| $K_2HPO_4$ | 1.0 g. |
| Czapek's mineral stock* | 5.0 ml. |
| Agar | 25.0 g. |
| Deionized water | 1 liter |

*Czapek's mineral stock has the following composition:

| Ingredient | |
|---|---|
| KCl | 100 g. |
| $MgSO_4.7H_2O$ | 100 g. |
| $FeSO_4.7H_2O$ | 2 g.(dissolved in 2 ml. conc. HCl) |
| Deionized water | 1 liter |

The pH of the medium was adjusted to pH 7.3 with sodium hydroxide solution. After sterilization by autoclaving at 120°C. for 30 minutes at 15–20 pounds pressure, the pH of the medium was 6.7.

The slant was inoculated with Actinoplanes sp. NRRL 3884 and incubated at 30°C. for seven to ten days. The mycelial growth was covered with sterile distilled water and the surface of the slant was scraped to loosen the organisms. Since the culture does not sporulate, it is desirable to macerate the mycelial mat with a flattened, sharpened inoculating needle in order to increase the number of potential growth centers. One half of a slant culture so prepared was used to inoculate 50 ml. of a vegetative medium having the following composition:

| Ingredient | |
|---|---|
| Glucose | 10.0 g. |
| Starch | 20.0 g. |
| Nutrisoy flour* | 20.0 g. |
| Yeast | 2.0 g. |
| $CaCO_3$ | 2.0 g. |
| Tap water | 1.1 liter |

*Available from Archer-Daniels-Midland Co., Decatur, Ill.

The inoculated vegetative medium was incubated for 72 hours at 30°C. on a rotary shaker operating at 250 rpm. Ten ml. of the fermentation mixture so obtained was used to inoculate 100 ml. of a second stage vegetative growth medium of the following composition:

| Ingredient | |
|---|---|
| Glucose | 10.0 g. |
| Dextrin 700* | 20.0 g. |
| Nutrisoy flour | 20.0 g. |
| Amber BYF 300** | 3.0 g. |
| $CaCO_3$ | 4.0 g. |
| Tap water | 1.1 liter |

*Potato Dextrin imported from Holland.
**Fraction of autolyzed brewer's yeast, Amber Laboratories, Juneau, Wisconsin.

The inoculated second stage vegetative growth medium was incubated for 48 hours at 30°C. on a rotary shaker (250 rpm). This second stage vegetative medium was of the following composition contained in a 250-ml. Erlenmeyer flask:

| Ingredient | Percent |
| --- | --- |
| Dextrose | 1.0 |
| Starch | 2.0 |
| Mannitol | 1.0 |
| Nutrisoy Flour | 1.5 |
| Amber BYF 300 | 0.1 |
| CaCO$_3$ | 0.2 |
| Tap water to 1 liter | |

The inoculated sterile production medium contained in the Erlenmeyer flask was allowed to ferment at 30°C. for 72–120 hours on a rotary shake operating at 250 rpm. The terminal pH was 7.0–7.5.

B. Tank fermentation of A477

The procedure described immediately above was followed through the preparation of the second stage vegetative medium. Two hundred milliliters of this vegetative medium was used to inoculate 25 liters of a sterile production medium of the following composition:

| Ingredient | Percent |
| --- | --- |
| Dextrose | 1.0 |
| Starch | 2.0 |
| Mannitol | 1.0 |
| Nutrisoy flour | 1.5 |
| Amber BYF 300 | 0.1 |
| CaCO$_3$ | 0.2 |
| Dow Corning antifoam | 0.02 |
| Water | 25 liters |

The pH of the medium was 7.3–7.4 after sterilization by autoclaving at 120°C. at 15–20 pounds pressure for 30 minutes. The inoculated production medium contained in a 45 liter fermentor was allowed to ferment at a temperature of 30°C. for five days. The fermentation was aerated with sterile air at a rate of one-half volume of air per volume of culture medium per minute. The fermentation was stirred with conventional agitators at 500 rpm.

C. Isolation of A477

The whole fermentation broths from two twenty-five liter tanks grown according to the procedure described in the previous section were combined and 5N sodium hydroxide was added to adjust the pH to pH 10.5. The whole broth was filtered using a filter aid and the filtrate saved. The mycelial cake was suspended in water and stirred for one hour. The suspension was filtered and the mycelial cake discarded. The filtrates were combined, yielding a total volume of 66.5 liters. The pH of the pooled filtrates was adjusted to pH 8.0 with 3N hydrochloric acid solution. The pooled filtrates were passed through a column loaded with Pittsburgh carbon (12 × 40 mesh) in water. The column was washed first with 15 liters of water and the effluent was discarded. The column was then washed with 20 liters of an aqueous solution of hydrochloric acid at pH 2.5 and the effluent was also discarded. The carbon column was thereupon eluted with four liters of an acetone-water (1:1) solution which had been adjusted to pH 2.0 with 3N hydrochloric acid, and the eluate collected.

The pH of the eluate was adjusted to pH 7.5–8.0 with 5N sodium hydroxide solution. The eluate containing the A477 activity was concentrated to a volume of about 1700 ml., and the concentrated eluate was adsorbed onto a 7 × 60 cm. column containing water-washed polyamide resin (M. Woelm, Eschwege, Germany).

The polyamide resin column was eluted with eight liters of water and the eluate collected in multiple fractions. The fractions containing A477 activity were combined and concentrate to a small volume. Four volumes of methanol were added to the concentrate and thereafter an equal volume of ether to precipitate antibiotic A477. The antibiotic was filtered and dried to yield 1.1 g.

An additional quantity of A477 was recovered by eluting the polyamide resin column with a methanol:water solution (1:1). The eluates containing A477 activity were combined and concentrated to a small volume. Four volumes of methanol were added to the concentrate and the antibiotic was precipitated by the addition of an equal volume of ether. The precipitate was recovered by filtration and weighed 3.0 grams.

PREPARATION 2

Purification of Antibiotic A477 using Alumina

The procedure described in Preparation 1, Part C, for the isolation of antibiotic A477 was followed through the elution of the Pittsburgh carbon column. The pH of the eluate was adjusted to pH 7.5–8.0 with 5N sodium hydroxide solution and then the eluate was concentrated to a volume of 200 ml.

One hundred milliliters of this concentrated eluate containing the A477 activity was applied to a 2.7 × 80 cm. column containing acid-washed alumina (Aluminum Company of America) packed in water. The column was then washed with two liters of methanol. The methanol effluent was discarded. The A477 activity was eluted from the column with aqueous methanol (1:1) and the active fractions were combined and concentrated to dryness. The dried residue was dissolved in 100 ml. of aqueous methanol (1:1). The resulting solution was added to 2 liters of acetone in order to precipitate the purified A477. Yield: 2.2 g.

PREPARATION 3

Preparation of A477 hydrochloride

Five hundred milligrams of A477, prepared according to the previous preparation, was dissolved in 20 ml. of 50% aqueous methanol. The solution was adjusted to pH 1.5 with 1N HCl. The resulting solution was added with stirring to 400 ml. of acetone to precipitate the A477 hydrochloride salt. The resulting precipitate was recovered by filtration and dried.

The yield of A477 hydrochloride was 420 mg.

PREPARATION 4

Preparation of A477 picrate

To a solution of 500 mg. of A477 in 20 ml. of water was added 20 ml. of saturated aqueous picric acid solution. The mixture was allowed to stand overnight at 5°C. A yellow precipitate formed and was filtered to yield 505 mg. of the yellow A477 picrate.

PREPARATION 5

Preparation of A477 hydrochloride from A477 picrate

To a solution of 505 mg. of A477 picrate salt in 25 ml. of methanol was added 1N hydrochloric acid until the pH reached pH 1.5. The resulting acidic solution was added with stirring to 500 ml. of diethyl ether in order to precipitate the A477 hydrochloride. The precipitate so formed was filtered and dried to yield 442 mg. of A477 hydrochloride.

PREPARATION 6

Preparation of A477 free base from A477 hydrochloride

A solution of 500 mg. of A477 hydrochloride in 20 ml. of water was passed over an ion exchange resin, (IR-45 (OH$^-$)), contained in a 1 × 10 cm. glass column. The effluent was collected and the column eluted with water. The aqueous eluate and initial effluents were combined and evaporated in vacuo to dryness. The residue was dissolved in 20 ml. of 50 percent aqueous methanol and added to 400 ml. of acetone with stirring to precipitate A477 free base.

The precipitate so formed was filtered and dried to yield 225 mg. of A477.

PREPARATION 7

Preparation of A477 sulfate

A solution of 500 mg. of A477 hydrochloride in 20 ml. of water was passed over a 1 cm. × 10 cm. column containing an ion exchange resin (IR-45 in the hydroxyl cycle). The column was washed with water and the active fractions were combined and concentrated to dryness. The resulting dried residue was dissolved in 20 ml. of 50 percent aqueous methanol. The pH of the solution was adjusted to pH 1.5 with 1N $H_2SO_4$, and the acidified solution was added to 400 ml. of acetone. A precipitate of A477 sulfate formed and was recovered by filtration. Yield, 331 mg.

PREPARATION 8

Preparation of methyl orange salt of A477

To a solution of 500 mg. of A477 in 20 ml. water was added 20 ml. of a saturated solution of methyl orange in water. The resulting solution was allowed to stand overnight until precipitation of the A477 methyl orange salt was complete. The methyl orange salt of A477 was recovered by filtration and dried. Yield, 521 mg.

Antibiotic A-4696 is a basic compound capable of forming salts with suitable acids, and has been characterized in the form of its hydrochloride salt. The antibiotic is conveniently isolated and characterized as the hydrochloride salt, although other pharmaceutically acceptable salts can be prepared by employing methods well known in the art.

Antibiotic A-4696, as the hydrochloride salt, is a white crystalline compound with a melting point greater than 220°C. It is soluble in water, and insoluble in solvents such as methanol, acetone, ether, chloroform, pyridine, benzene, aliphatic hydrocarbons, and the like. It is very stable in solution over a pH range of from about 1.0 to about 10.0, at temperatures up to about 27°C.

Electrometric titration of A-4696 hydrochloride in water or in dimethylformamide:water (2:1) produces a curve approximating a straight line with a slope of about 0.14 from pH 6.0 to pH 13.0.

An average of several microanalyses has shown A-4696 hydrochloride to have approximately the following percent elemental composition: C, 51.33; H, 5.79; N, 5.46; O, 30.96; cl 6.72. The apparent molecular weight as determined by the vapor pressure osmotic method is 1158.

The specific rotation ($[\alpha]_D$), of A-4696 hydrochloride at 25°C., is −42.3° (C=1, $H_2O$).

The ultraviolet absorption spectrum of A-4696 hydrochloride in acidic and neutral solutions shows a single absorption maximum at 276 m$\mu$., with an extinction coefficient, $E_{1cm.}^{1\%}$, of 65.

Figure 2:
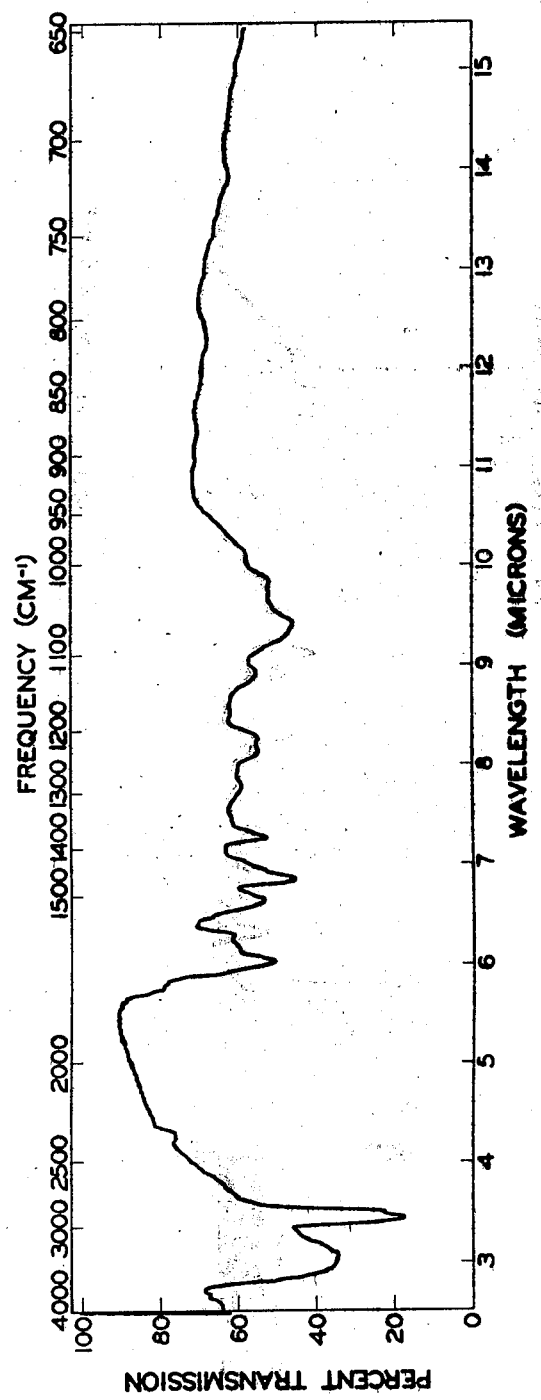

The infrared absorption spectrum of A-4696 hydrochloride in a mineral oil mull is shown in the accompanying drawing, FIG. 2. The observed distinguishable absorption maxima over the range 2.0 to 15.0 $\mu$. are as follows: 3.0, 5.8, 5.9, 6.03, 6.15, 6.28, 6.63, 6.85, 7.27, 7.75, 8.1, 8.25, 8.9, 9.4, 9.9, 10.1 microns.

The microorganism used for the production of antibiotic A-4696 has been identified as a strain of a species of Actinoplanes of the family Actinoplanaceae. The Actinoplanaceae are a new family of microorganisms of the order Actinomycetales, having been first described by Dr. John N. Couch, *Jour. Elisha Mitchell Sci. Soc.*, 65, 315–318 (1949); and 66, 87–92 (1950); *Trans. New York Acad. Sci.*, 16, 315–318 (1954); *Jour. Elisha Mitchell Sci. Soc.*, 71, 148–155 and 269 (1955); *Bergey's Manual of Determinative Bacteriology*, 7th Edition, 825–829 (1957); and *Jour. Elish Mitchell Sci. Soc.*, 79, 53–70 (1963).

The Actinoplanes sp. useful for the production of antibiotic A-4696 has been deposited and made a part of the stock culture collection of the American Type Culture Collection, Rockville, Maryland, from which it is available to the public without restriction under the number ATCC 23342.

The Actinoplanes sp. useful for the production of A-4696 was isolated from a sample of soil obtained from the Cascade mountain area in the state of Washington. This organism has been designated number 581, in the collection of Dr. John N. Couch at the University of North Carolina.

As previously noted, Actinoplanes sp., strain ATCC 23342, can be grown in a culture medium to produce antibiotic A-4696. A culture medium providing for economy in production, maximum yield, and ease of isolation of the antibiotic is preferred. Thus, for example, starch is one of the preferred sources of carbohydrate, and soybean meal is one of the preferred nitrogen sources. Other carbohydrate sources which can be used include molasses, glucose, dextrin, glycerol, and the like. Nitrogen sources also include amino acid mixtures, peptones, and the like.

Nutrient inorganic salts to be incorporated in the culture media can include the customary salts capable of yielding sodium, potassium, ammonia, calcium, phosphate, chloride, sulfate, acetate, carbohydrate, and like ions. Additionally, sources of growth factors, such as distillers' solubles and yeast extracts, can be included with beneficial effect on the production of A-4696 antibiotic. As is necessary for the growth and development of other microorganisms, essential trace elements should also be included in the culture medium for growing the Actinoplanes sp. employed in this invention. Such trace elements are commonly supplied as impurities incidental to the addition of the other constituents of the medium.

While the organism used to produce A-4696 can be grown over a relatively wide pH range, it is desirable to adjust the pH of the culture medium to between about pH 6.5 and pH 7.2 before inoculation with the organism. As with other Actinomycetes, the pH of the growing medium gradually changes during the growth period, the pH at the end of the fermentation period usually ranging from about 7.0 to 7.8.

Submerged aerobic cultural conditions are preferred for the production of A-4696, with growth occurring at temperatures between about 20° and 40°C. The largest amounts of A-4696 appear to be produced at a temperature of about 30°C. within a period of about 4 to 6 days.

The preparations of A-4696 and its salts are exemplified hereinbelow.

PREPARATION 9

A. Shake Flask Fermentation of Antibiotic A-4696

Mycelial fragments of Actinoplanes sp., strain ATCC 23342, were inoculated on a nutrient agar slant having the following composition:

| Ingredient | Amount | |
|---|---|---|
| Precooked oatmeal | 60 | g. |
| Yeast | 2.5 | g. |
| $K_2HPO_4$ | 1.0 | g. |
| Dried distiller's solubles | 5.0 | g. |
| Czapek's mineral stock* | 5.0 | ml. |
| Agar | 25 | g. |
| Water, deionized | 1 | l. |
| *Czapek's mineral stock has the following composition: | | |
| KCl | 100 | g. |
| $MgSO_4.7H_2O$ | 100 | g. |
| $FeSO_4.7H_2O$ | 2 | g. |
| (Dissolve in two mls. conc. HCl) | | |
| Water, deionized | 1 | l. |

The slant was inoculated with ATCC 23342 and incubated for 6 days at 30°C. The culture does not normally sporulate on this medium, and it is necessary to macerate the mycelial mat with a flattened, sharpened, inoculating needle in order to increase the number of potential growth centers. The macerated mature culture was covered with sterile distilled water and scraped carefully with a sterile rod to obtain a mycelial suspension.

The suspension thus obtained was used to inoculate 100 ml. of a sterile vegetative medium having the following composition:

| Ingredient | Amount | |
|---|---|---|
| Glucose | 5.0 | g. |
| Dextrin | 20.0 | g. |
| Soybean meal | 15.0 | g. |
| Yeast extract | 2.5 | g. |
| Calcium carbonate | 1.0 | g. |
| Water, tap | 1 | l. |

The inoculated vegetative medium was grown for 48 hours at 30°C. on a rotary shaker operating at 250 rpm.

Ten ml. of the incubated vegetative medium was inoculated into 100 ml. of a sterile "bump" medium of the same composition as given next above. The thus inoculated "bump" medium was incubated for 24 hours at 30°C. with constant shaking on a rotary shaker operating at 250 rpm.

Four-tenths ml. of the incubated "bump" medium was inoculated into 100 ml. portions of a production medium of the composition shown below contained in 500 ml. Erlenmeyer flasks, and sterilized at 120°C. for 30 minutes:

| Ingredient | Percent |
|---|---|
| Dextrose | 1.0 |
| Dextrin | 3.0 |
| Peptone | 1.5 |
| Soybean meal | 0.5 |
| $MgSO_4.7H_2O$ | 0.2 |
| Molasses, beet sugar | 1.5 |
| Corn steep liquor | 0.5 |
| Betaine | 0.1 |
| $K_2HPO_4$ | 0.05 |
| Water, deionized, q.s. | 25 l. |

The pH of the medium was adjusted to 7.5 with 5N sodium hydroxide solution before sterilization. After sterilization the pH was approximately 6.9.

The production medium was fermented by shaking for about 96 hours at a temperature of 30°C. on a rotary shaker operating at 250 rpm. The pH at the end of the fermentation cycle was about 7.2.

B. 40-Liter Tank Fermentation of Antibiotic A-4696

The preparation of the inoculum proceeded through the incubation of the "bump" medium detailed under section A, above. Twenty-five liters of a production medium prepared as outlined above, with 0.02% Dow Corning antifoam added, was sterilized by autoclaving at 120°C. for 30 minutes, and was charged into a 40 l. fermentation tank. One-hundred milliliters of incubated "bump" medium was inoculated into the sterile production medium. The inoculated production medium contained in the 40 l. tank was allowed to ferment for 4 days at 30°C. The fermentation was aerated with sterile air in an amount of about one-half volume of air per volume of culture medium per minute. The fermenting production medium was agitated with a mixer utilizing an impeller of a proper size and turning at an appropriate rpm to insure adequate mixing of air with the medium. The pH of the culture medium gradually increased from an initial level of about 6.9 to about 7.2 as the fermentation proceeded.

C. Isolation of Antibiotic A-4696

The whole broth obtained from an A-4696 fermentation, as described above, was filtered with the aid of a commercial filter aid. The filtrate was set aside. The mycelial cake was washed with 32 l. of water and the wash water set aside. The mycelial cake was then suspended in an additional 32 l. of water and the pH of the mixture adjusted to pH 10.5 with 5N sodium hydroxide solution. The mycelial cake water suspension was stirred for 45 minutes and the mixture was filtered. This filtrate and the water wash were combined with the original filtrate from the fermentation broth and the pH of the combined filtrates was adjusted to pH 4.0 with $H_2SO_4$. The acidified combination of filtrates was passed through a carbon column utilizing 1 kg. of activated carbon, (Pittsburgh, 12 × 40). The activated carbon column was washed until the effluent was colorless. The A-4696 activity was adsorbed on the carbon column. The A-4696 activity was eluted from the carbon column utilizing a 1% $H_2SO_4$ solution in acetone:$H_2O$ (1:1). Two liters of the acidified acetone-water solution was sufficient to elute the A-4696 activity from the carbon column. The eluate containing the A-4696 activity was treated with a saturated barium hydroxide solution. A precipitate of barium sulfate was formed, thus removing the sulfate ions from the solution.

The mixture was filtered and the barium sulfate precipitate was discarded. The filtrate containing the A-4696 activity was concentrated under vacuum to dryness. The resulting residue comprising the A 4696 activity weighed approximately 80 g.

D. Conversion of A-4696 Activity to Crude A-4696 Hydrochloride

The approximately 80 g. of A-4696 activity obtained above was taken up in 5 l. of water, and there was added thereto 500 g. of activated carbon (Darco G-60, Atlas Chemical, Wilmington, Del.). This mixture was stirred for 1 hour and then filtered. The filtrate was discarded. The carbon filter cake containing the A-4696 activity was washed with 1 l. of water and the water wash was discarded. The carbon filter cake was further washed with 1 l. of 0.05N aqueous hydrochloric acid. The acid wash was discarded. The washed carbon cake was eluted by stirring 30 minutes with 500 ml. of an aqueous hydrochloric acid-acetone solution (0.05N HCl:acetone[7:3]). The mixture was filtered and the filtrate set aside. The elution of the activated carbon was repeated 4 times in the same manner, each time setting aside the filtrate. The five filtrates containing the A-4696 activity were combined. The combined filtrates were then concentrated under vacuum to a volume of approximately 100 ml. Two hundred milliliters of methanol was added to the aqueous concentrate containing the A-4696 activity. Two liters of acetone was added to this aqueous-methanol solution. A precipitate, consisting of crude A-4696 hydrochloride, formed in the acetone-aqueous methanol solution. After filtering and drying, the precipitate of crude A-4696 hydrochloride weighed 60.9 g.

E. Preparation of Crystalline A-4696 Hydrochloride

Twenty-five grams of A-4696 hydrochloride, prepared according to the procedure outlined above, was dissolved in 20 ml. of water. The A-4696 hydrochloride solution was passed over a water-washed polyamide resin bed, (M. Woelm, Eschwege, Germany), contained in a glass column measuring approximately 7 × 60 centimeters. The effluent was set aside. The polyamide resin column was washed with water at a flow rate of approximately 8–10 ml. per minute. The antimicrobial activity of the column effluent was measured by conventional procedures. The effluents containing antimicrobial activity were combined and concentrated to dryness under vacuum. The residue thus obtained was dissolved in a mixture of 25 ml. water and 50 ml. methanol. This aqueous methanol solution of A-4696 hydrochloride was acidified to a pH of 2.0 with 5N HCl. Approximately 1.5 l. of acetone was added to the aqueous methanol solution to precipitate the hydrochloride salt which was recovered therefrom.

The filter cake containing the A-4696 hydrochloride was dissolved in minimum quantity of water. An amount of ethanol equal to twice the volume of water was added and the mixture was heated to approximately 60°C. The mixture was then cooled and the hydrochloride salt of A-4696 crystallized therefrom. The crystals were filtered off and dried. Approximately 9 g. of crystalline A-4696 hydrochloride was obtained in this manner.

PREPARATION 10

Two grams of A-4696 hydrochloride was dissolved in 300 ml. of water, the pH adjusted to 7.5 with 5N sodium hydroxide, and 30 g. of Darco G-60 carbon was added. The mixture was stirred for 30 minutes, filtered with the aid of a commercial filter aid, and the filter cake washed successively with 300 ml. each of water and 0.05N $H_2SO_4$.

The antibiotic activity was eluted from the filter cake by adding the filter cake to 500 ml. of a mixture consisting of 70% 0.05N $H_2SO_4$ and 30% acetone, stirring for 30 minutes, and filtering to remove the carbon. The filtrate was concentrated to approximately 10 milliliters. About 20 ml. of methanol was added to the concentrate, and the thus formed solution was added to 600 ml. of acetone to precipitate the A-4696 sulfate. The precipitate was filtered off, washed with acetone, and dried in vacuo, yielding 862 mg. of A-4696 sulfate as a white crystalline salt.

The antibiotics operable in this novel method have the common property of forming salts with inorganic acids. Representatives of the inorganic acids forming physiologically-acceptable salts with the antibiotics include hydrochloric acid, sulfuric acid, phosphoric acid, hydrobromic acid, and the like. Methods of preparing specific acid addition salts of the specific antibiotics have been set forth above. They are all procedures commonly employed for the preparation of such salts and are generally well known in the art.

It is well known in the veterinary pharmaceutical art that the form of an antibiotic used in the treatment of an animal is immaterial. Conditions within the animal frequently change the drug to forms other than that in which it was administered. Therefore, the form in which the antibiotic may be administered is insignificant to the method of treatment, and may be chosen for reasons of economics, convenience, and toxicity.

The experimental examples which follow show that the presently described antibiotics are effective in this method. The terms A477, A-4696, vancomycin, and ristocetin are intended to include physiologically-acceptable salts of those antibiotics.

The effectiveness of this novel method of modifying the ratio of volatile fatty acids produced in the rumen was first proven by means of in vitro tests according to the procedure set forth hereinbelow.

EXAMPLE

Rumen fluid was obtained from a steer which has a surgically-installed fistula opening into the rumen. The steer was maintained on a high-grain ration, the composition of which follows:

| | |
|---|---|
| 69.95% | coarse ground corn |
| 10 % | ground corncobs |
| 8 % | soybean meal (50% protein) |
| 5 % | alfalfa meal |
| 5 % | molasses |
| 0.6 % | urea |
| 0.5 % | dicalcium phosphate |
| 0.5 % | calcium carbonate |
| 0.3 % | salt |
| 0.07% | Vitamin A and $D_2$ premix |
| 0.05% | Vitamin E premix |
| 0.03% | trace mineral premix |

A sample of rumen fluid was strained through 4 layers of cheesecloth and the filtrate was collected in a vacuum bottle. The particulate matter retained by the cheesecloth was resuspended in enough physiological buffer to return it to the original volume of the rumen fluid, and the suspension was again strained through cheesecloth. The buffer used is described below:

| | |
|---|---|
| 0.316 g./liter | $Na_2HPO_4$ |
| 0.152 g./liter | $KH_2PO_4$ |
| 2.260 g./liter | $NaHCO_3$ |
| 0.375 g./liter | KCl |
| 0.375 g./liter | NaCl |
| 0.112 g./liter | $MgSO_4$ |
| 0.038 g./liter | $CaCl_2$ |
| 0.008 g./liter | $FeSO_4 \cdot 7H_2O$ |
| 0.004 g./liter | $MnSO_4$ |
| 0.004 g./liter | $ZnSO_4 \cdot 7H_2O$ |
| 0.002 g./liter | $CuSO_4 \cdot 5H_2O$ |
| 0.001 g./liter | $CoCl_2$ |

Cheng et al., *J. Dairy Sci.* 38, 1225, (1955).

The two filtrates were pooled in a separatory funnel and allowed to stand till particulate matter rose to the top. The clear layer was then separated and diluted 1:1 with the same buffer, and adjusted to pH 7.0.

Ten ml. of the diluted rumen fluid thus prepared was placed in a 25 ml. flask with 40 mg. of finely-powdered high-grain ration, the composition of which is described above. Five mg. of soybean protein was also added per flask. The compound to be tested was weighed out and dissolved in the appropriate solvent, supra. The solution was placed on the finely-powdered ration in each test flask and dried.

Two sets of four untreated control flasks each were also prepared. One set of four untreated control flasks was incubated for 16 hours at 38°C. with the test flasks. The other set of four untreated control flasks were zero-time controls, the fermentation in which was stopped as soon as the flasks were prepared by addition of 2 ml. of 25 percent metaphosphoric acid to each flask.

Fermentation in the incubated test and control flasks was stopped at the end of 16 hours by addition of 2 ml. of 25 percent metaphosphoric acid to each flask.

All of the samples were allowed to settle, and the supernatant was analyzed by gas chromatographic methods for acetate, propionate, and butyrate.

The analysis for each volatile fatty acid found in the zero-time controls was subtracted from the analyses of the untreated controls and of the test flasks. The resulting values reflect the amount of each VFA produced during the 16-hour fermentation period.

The data below are reported as the ratio of VFA's produced in treated flasks to VFA's produced in untreated control flasks. This method of reporting the data shows most clearly the results of the changes in the chemistry of the rumen brought about by the present novel method of feed utilization improvement. The data are means where a given test has been repeated.

| Compound | Rate | Acetate | Propionate | Butyrate |
|---|---|---|---|---|
| Vancomycin base | 10 mcg./ml. | 1.03 | 1.31 | 0.66 |
| | 1 | 0.97 | 1.25 | 0.83 |
| | 0.5 | 1.01 | 1.06 | 0.96 |
| | 0.25 | 1.00 | 1.00 | 1.01 |
| A-4696 | 25 | 0.53 | 1.77 | 1.07 |
| | 10 | 0.95 | 1.31 | 0.86 |
| | 5 | 1.06 | 1.22 | 0.74 |
| | 1 | 1.01 | 1.09 | 0.90 |
| | 0.5 | 1.02 | 1.00 | 0.98 |
| | 0.25 | 1.03 | 0.97 | 0.98 |
| | 0.2 | 1.01 | 1.02 | 0.95 |
| A-477 | 10 | 1.00 | 1.41 | 0.64 |
| | 1 | 1.02 | 1.10 | 0.87 |
| | 0.5 | 0.99 | 1.07 | 0.97 |
| | 0.25 | 1.00 | 1.00 | 1.01 |
| Ristocetin | 10 | 0.995 | 1.21 | 0.77 |
| | 2 | 0.98 | 1.22 | 0.85 |
| | 0.5 | 0.98 | 1.13 | 0.90 |

The data tabulated above shows that the antibiotics named are effective in increasing propionate production in the rumen.

Administration of the antibiotic compounds useful in this method prevents and treats ketosis as well as improves feed utilization. The causative mechanism of ketosis is a deficient production of propionate compounds. A presently recommended treatment is administration of propionic acid or feeds which preferentially produce propionates. It is obvious that the method of this application, which method encourages propionate production from ordinary feeds, will reduce incidence of ketosis.

It has been found that the antibiotic compounds disclosed herein increase the efficiency of feed utilization in ruminant animals. The easiest way to administer the antibiotics is by mixing them in the animal's feed.

However, the antibiotic compounds can be usefully administered in other ways. For example, they can be incorporated into tablets, drenches, boluses, or capsules, and dosed to the animals. Formulation of the antibiotic compounds in such dosage forms can be accomplished by means of methods well known in the veterinary pharmaceutical art. Each individual dosage unit should contain a quantity of the feed-efficiency-improving compound which has a direct relation to the proper daily dose for the animal to be treated.

Capsules are readily produced by filling gelatin capsules with any desired form of the desired antibiotic. If desired, the antibiotic can be diluted with an inert powdered diluent, such as a sugar, starch, or purified crystalline cellulose in order to increase its volume for convenience in filling capsules.

Tablets of the antibiotics used in this novel method are made by conventional pharmaceutical processes. Manufacture of tablets is a well-known and highly-advanced art. In addition to the active ingredient, a tablet usually contains a base, a disintegrator, an absorbent, a binder, and a lubricant. Typical bases include lactose, fine icing sugar, sodium chloride, starch and mannitol. Starch is also a good disintegrator, as is alginic acid. Surfaceactive agents such as sodium lauryl sulfate and dioctyl sodium sulphosuccinate are also sometimes used. Commonlyused absorbents again include starch and lactose while magnesium carbonate is also useful for oily substances. Frequently-used binders are gelatin, gums, starch, dextrin and various cellulose derivatives. Among the commonly-used lubricants are magnesium stearate, talc, paraffin wax, various metallic soaps, and polyethylene glycol.

This novel method can also be practiced by the administration of the antibiotic compound as a slow-payout bolus. Such boluses are made as tablets are made, except that a means to delay the dissolution of the antibiotic is provided. Boluses are made to release for lengthy periods. The slow dissolution is assisted by choosing a highly water-insoluble form of the antibiotic. A substance such as iron filings is added to raise the density of the bolus and keep it static on the bottom of the rumen.

Dissolution of the antibiotic is delayed by use of a matrix of insoluble materials in which the drug is embedded. For example, substances such as vegetable waxes, purified mineral waxes, and water-insoluble polymeric materials are useful.

Drenches of the antibiotics are prepared most easily by choosing a water-soluble form of the antibiotic. If an insoluble form is desired for some reason, a suspension may be made. Alternatively, a drench may be formulated as a solution in a physiologically-acceptable solvent such as a polyethylene glycol.

Suspensions of insoluble forms of the antibiotics can be prepared in nonsolvents such as vegetable oils such as peanut, corn, or sesame oil; in a glycol such as propylene glycol or a polyethylene glycol; or in water, depending on the form of the antibiotic chosen.

Suitable physiologically-acceptable adjuvants are necessary in order to keep the antibiotic suspended. The adjuvants can be chosen from among the thickeners, such as carboxymethylcellulose, polyvinylpyrrolidone, gelatin, and the alginates. Many classes of surfactants also serve to suspend antibiotics. For example, lecithin, alkylphenol polyethylene oxide adducts, naphthalenesulfonates, alkylbenzenesulfonates, and the polyoxyethylene sorbitan esters are useful for making suspensions in liquid nonsolvents.

In addition, many substances which affect the hydrophilicity, density, and surface tension of the liquid can assist in making suspensions in individual cases. For example, silicone antifoams, glycols, sorbitol, and sugars can be useful suspending agents.

The suspendable antibiotic may be offered to the animal grower as a suspension, or as a dry mixture of the antibiotic and adjuvants to be diluted before use.

The antibiotics may also be administered in the drinking water of the ruminants. Incorporation into drinking water is performed by adding a water-soluble or water-suspendable form of the desired antibiotic to the water in the proper amount. Formulation of the antibiotic for addition to drinking water follows the same principles as formulation of drenches.

The most practical way to treat animals with these antibiotic compounds is by the formulation of the compounds into the feed supply. Any type of feed may be medicated with the antibiotic compounds, including common dry feeds, liquid feeds, and pelleted feeds.

The methods of formulating drugs into animal feeds are well known. It is usual to make a concentrated drug premix as a raw material for medicated feeds. For example, typical drug premixes may contain from about one to about 400 grams of drug per pound of premix. The wide range results from the wide range of concentration of drug which may be desired in the final feed. Premixes may be either liquid or solid.

The formulation of animal feeds containing the proper amounts of the antibiotic compounds for useful treatment is mainly a matter of arithmetic. It is necessary only to calculate the amount of compound which it is desired to administer to each animal, to take into account the amount of feed per day which the animal eats, and the concentration of antibiotic compound in the premix to be used, and calculate the proper concentration of antibiotic compound in the feed.

All of the methods of formulating, mixing, and pelleting feeds which are normally used in the ruminant or nonruminant feed art are entirely appropriate for manufacturing feeds containing the antibiotic compounds usable in this method.

It is not intended to limit the scope of this invention to any particular formulations or methods of administration. The invention is a method of increasing the efficiency of feed utilization by ruminant animals by the oral administration of certain antibiotics. However the administration may be accomplished, it is regarded as coming within the scope of the invention.

It is usual to treat economic animals, including ruminants, with a variety of growth promoters, disease-preventives, and disease treatments throughout their lives. Such drugs are often used in combination. The instant method may be practiced in combination with other treatments.

As has been shown, antibiotics A477, A-4696, vancomycin, and ristocetin, beneficially alter the production of propionates relative to the production of acetates in the rumen. The same treatment also benefits monogastric animals which ferment fibrous vegetable matter in the cecum. The monogastric animals here referred to are those which consume fibrous vegetable food and digest at least part of it by microbiological fermentation in the cecum. The cecal fermentation follows a chemical pathway similar to rumen fermentation.

Horses, swine, and rabbits are exemplary animals which digest a part of their food by cecal fermentation. The overall feed utilization of such animals is improved by the oral administration of these antibiotics which cause a beneficial change in the propionate/acetate ratio. Horses and rabbits are exemplary of animals in which cecal fermentation is a major part of the total digestive process, and in which these antibiotics are accordingly particularly beneficial.

I claim:

1. A method of increasing the efficiency of feed utilization by ruminant animals having a developed rumen function which comprises the oral administration to such animals of a propionate-increasing amount of an antibiotic chosen from the group consisting of A477, A-4696, and their physiologically-acceptable esters and salts.

2. The method of claim 1 wherein the ruminant animals are cattle.

3. The method of claim 1 wherein the ruminant animals are sheep.

4. The method of claim 1 wherein the antibiotic is administered at a rate of from about 0.10 mg./kg./day to about 10.0 mg./kg./day.

5. The method of claim 1 wherein the antibiotic is administered at a rate of from about 0.2 mg./kg./day to about 2 mg./kg./day.

6. The method of claim 4 wherein the ruminant animals are cattle.

7. The method of claim 4 wherein the ruminant animals are sheep.

* * * * *

UNITED STATES PATENT AND TRADEMARK OFFICE
CERTIFICATE OF CORRECTION

PATENT NO. : 3,928,571
DATED : December 23, 1975
INVENTOR(S) : Arthur P. Raun

It is certified that error appears in the above-identified patent and that said Letters Patent are hereby corrected as shown below:

Column 7, lines 3-5, the sentence should read ---This second stage vegetative medium was employed to inoculate 30 ml. of a sterile production medium of the following composition contained in a 250-ml. Erlenmeyer flask:---

Column 7, line 18, "shake" should read ---shaker---.

Column 8, line 12, "concentrate" should read ---concentrated---

Column 16, line 55, "Surfaceactive" should read ---Surface-active---.

Column 16, line 57, "Commonlyused" should read ---Commonly-used---.

*Signed and Sealed this*

*twenty-third* Day of *March 1976*

[SEAL]

Attest:

RUTH C. MASON
*Attesting Officer*

C. MARSHALL DANN
*Commissioner of Patents and Trademarks*